United States Patent [19]

Morissette

[11] 4,121,893
[45] Oct. 24, 1978

[54] BALL AND SOCKET COUPLING

[76] Inventor: Gilles Morissette, 9555 - 5th St., Rivière des Prairies, Canada, H1E 1K4

[21] Appl. No.: 791,039

[22] Filed: Apr. 26, 1977

[30] Foreign Application Priority Data

Apr. 28, 1976 [GB] United Kingdom ............... 17223/76

[51] Int. Cl.² ........................................... F16C 11/00
[52] U.S. Cl. .................................... 403/143; 403/319; 403/353; 280/510; 280/513
[58] Field of Search .............. 403/122, 131, 135, 143, 403/90, 56, 137, 361, 353, 315, 319; 280/510, 511, 512, 513

[56] References Cited

U.S. PATENT DOCUMENTS

| 2,438,749 | 3/1948 | Harrer | 280/511 |
| 3,776,649 | 12/1973 | Kemezys | 403/90 |
| 3,902,575 | 9/1975 | Nelson et al. | 403/144 X |
| 3,909,033 | 9/1975 | Russell | 403/143 X |

FOREIGN PATENT DOCUMENTS 241,257 6/1946 Switzerland ............................ 403/143

Primary Examiner—Wayne L. Shedd

[57] ABSTRACT

A ball and socket coupling in which the ball is positively retained within the socket by means of a cap, removably secured to the socket for closing the open end of the latter and having a hole through which the ball stem extends. The cap hole allows pivotal movement of the ball relative to the socket. The socket and the cap have inter-engaging interrupted threads for securing and releasing the cap by a simple one-quarter turn of the same. A lever is pivoted to the cap and engages between ears on the socket in the secured position of the cap to provide a safety lock. The resulting coupling is much stronger than conventional ball and socket couplings, because the cap forms an abutment face all around the ball.

2 Claims, 9 Drawing Figures

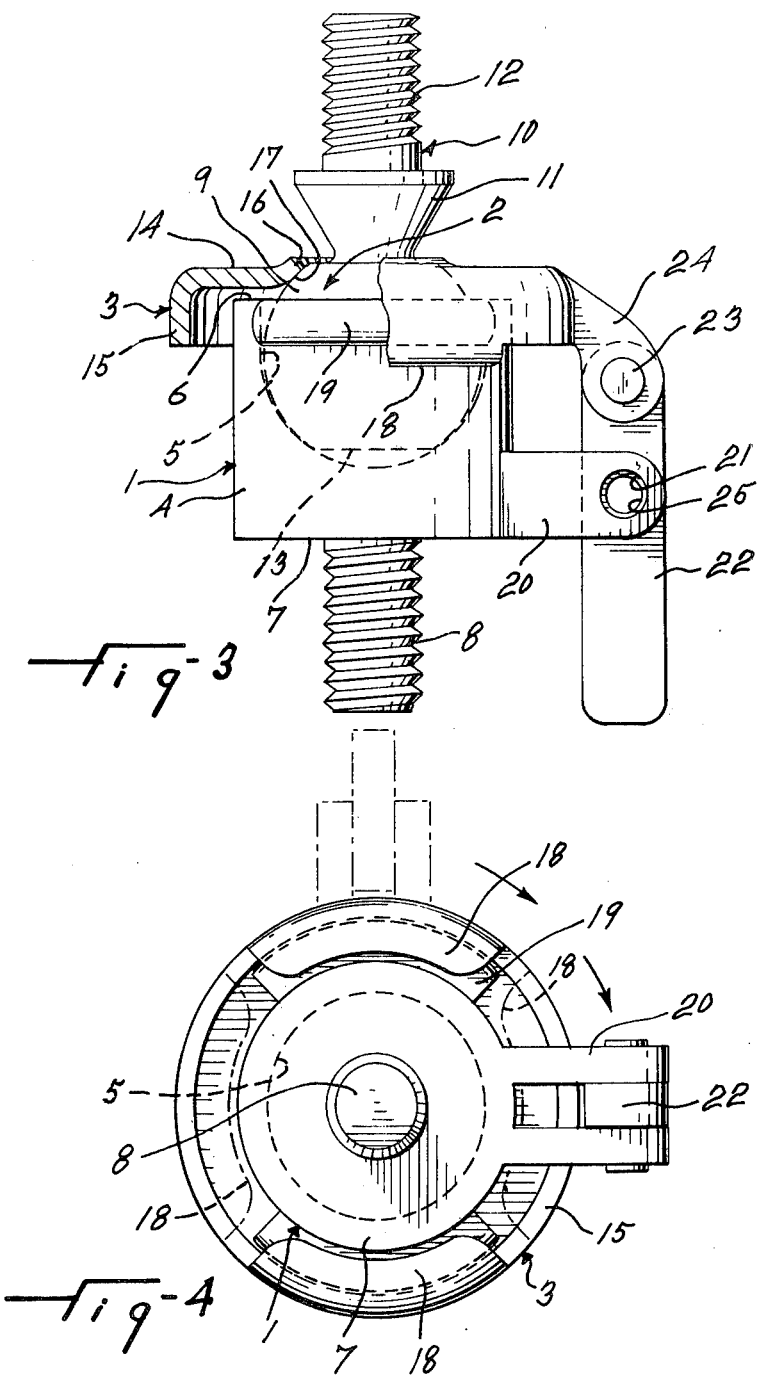

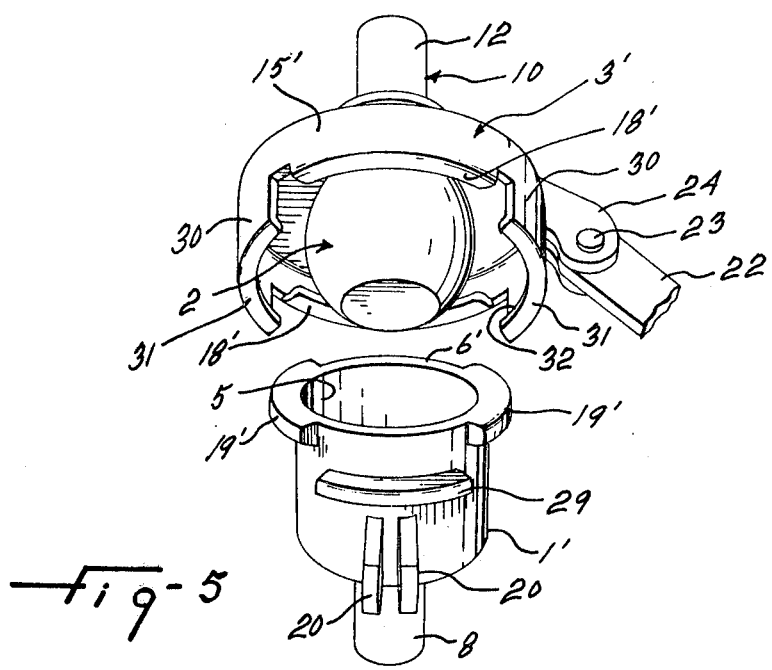
_fig-5_
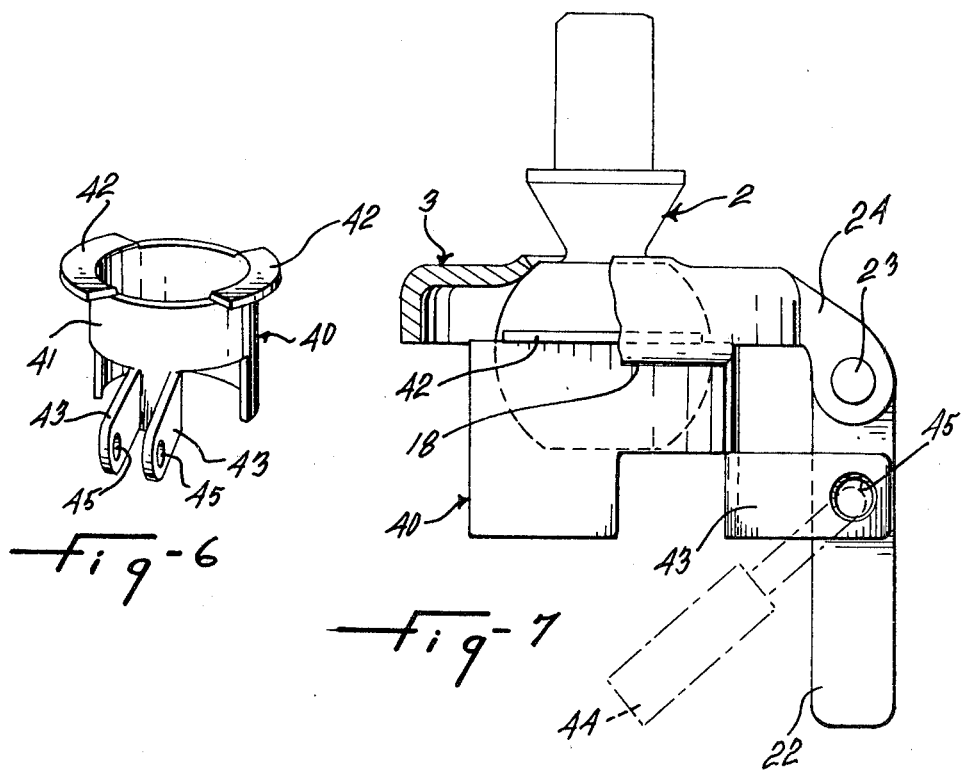
_fig-6_
_fig-7_

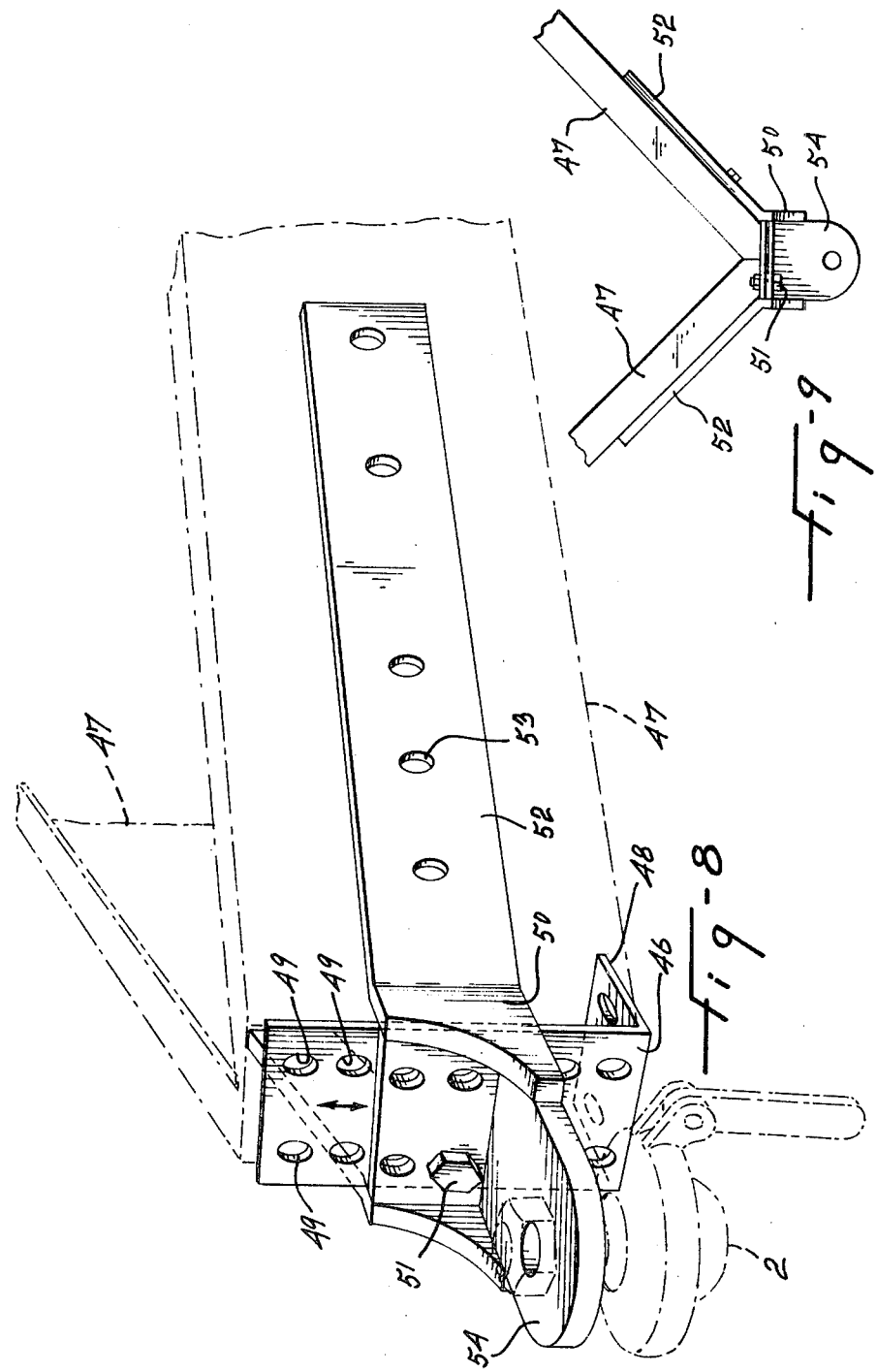

BALL AND SOCKET COUPLING

The present invention relates to a ball and socket coupling for use, for example, as a trailer hitch.

The general object of the invention is to provide a ball and socket coupling in which the ball is retained in the socket by novel means which completely preclude accidental disengagement of the ball and which, therefore, results in a much safer coupling than known couplings of this type.

Another object of the invention is to provide a coupling of the character described, which can be easily and very quickly connected and and disconnected.

Another object of the invention is to provide a coupling of the character described, which is of simple and inexpensive construction.

Another object of the invention is to provide a bracket for mounting one of the elements of the coupling in a vertically adjustable manner on the trailer so as to level the same with respect to the hauling vehicle.

The foregoing and other objects of the invention will become more apparent during the following disclosure and by referring to the drawings, in which:

FIG. 3 is an elevation, partially in section, of the assembled coupling;

FIG. 4 is a bottom plan view of the assembled coupling;

FIG. 5 is a perspective view of a modified embodiment of the disassembled coupling;

FIG. 6 is a perspective view of anti-theft device to be used with the ball member of the coupling;

FIG. 7 is a side elevation, partially in section, of the ball member fitted with the anti-theft device of the invention;

FIG. 8 is a perspective view of a trailer bracket provided with level adjusting means for one of the two elements of the coupling; and FIG. 9 is a top plan view of the bracket of FIG. 8.

In the drawing, like reference characters indicate like elements throughout.

Figure 2:
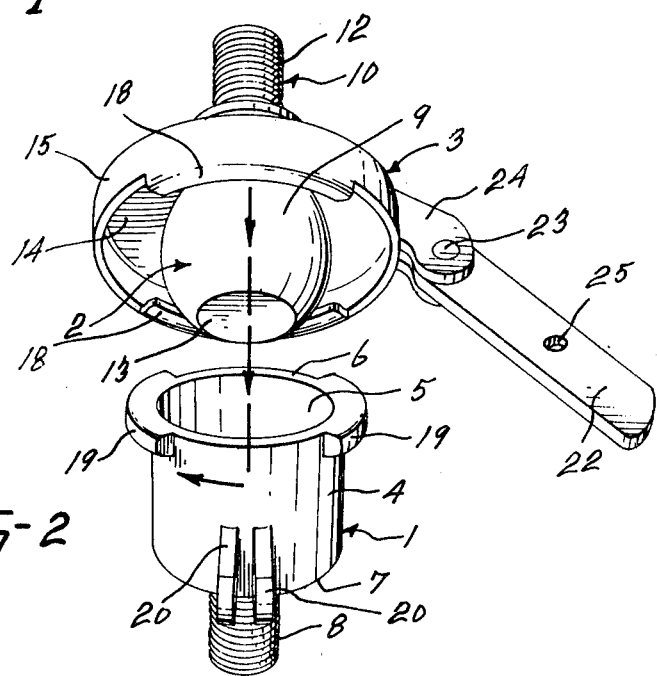
FIG. 2 is an exploded perspective view of the disassembled coupling.

Referring more particularly to FIG. 2, the ball and socket coupling in accordance with the a first embodiment of the invention comprises a socket member 1, a ball member 2 and a cap member 3. The socket member 1 forms a cylindrical body having a cylindrical outer face 4 and in which is formed a hemispherical cavity 5 (see FIG. 3) opening at the outer end 6 of the body. The body has a bottom wall 7, from the center of which projects a bolt 8 for securing the socket to one of the two parts to be coupled.

The ball member 2 is of conventional construction, including a spherical body 9 from which extends a stem 10 comprising, for instance, the conical stem portion 11 and the externally threaded stem portion 12, forming a bolt for firmly securing the ball member to the other part of the two parts to be coupled.

The ball 9 may be completely spherical or provided with a flat, as shown as 13, opposite the stem 10. The ball 9 has a diameter to have a sliding fit with hemispherical cavity 5.

The cap 3 in accordance with the invention is of circular shape and provides a wall portion 14, from the outer end of which depends a cylindrical skirt 15. The wall 14 has a central hole 16 through which extends the stem 10 of the ball member. Said hole 16 has a larger diameter than the portion of the stem extending through the same, so that the cap can pivot in all planes with respect to the ball member. Hole 16 has a smaller diameter than that of ball 9.

The marginal portion of the hole 16 forms a partly spherical inner surface 17 conforming to the outer surface of the ball to have a sliding fit with the latter.

The skirt 15 and the outer wall surface 4 of the socket are provided with inter-engageable interrupted treads enabling quick connecting and disconnecting of the cap to and from the socket by a simple rotation of the cap with respect to the socket. More particularly, the thread on the cap consists of a pair of diametrically opposed inwardly directed flanges 18 equally spaced apart, while the interrupted threads on the socket consist of a pair of equally spaced radially outwardly protruding flanges 19 formed adjacent the outer end 6 of the socket body. The spacing between the flanges 19 is at least as long as the length of the cap flanges 18 of the cap and, similarly, the spacing between the flanges 18 is at least as long as the length of the socket flanges 19.

Once the ball is fitted within the socket, it is a simple matter to align the cap flanges 18 with the spacings between the socket flanges 19, as shown in FIG. 2, than push the cap towards the socket, so that the cap flanges 18 are offset with respect to the socket flanges 19 inwardly from the socket outer end 6 and then turn the cap with respect to the socket through one-quarter turn, so as to cause overlapping engagement of the two sets of flanges. Preferably, the flanges 18 and 19 are slightly inclined as a screw thread, so that in the locked position of the cap on the socket, further rotation of the cap is prevented because of the engagement of the cap curved inside surface 17 with the ball surface, as shown in FIG. 3.

In the locked position of the cap, the ball is slidably retained within the socket and against the cap all around the ball member, thereby positively retaining the ball member within the socket against accidental removal of the ball member. This results in a very safe coupling.

Means are provided to positively lock the cap against rotation with respect to the socket. These means consist of a pair of parallel ears 20 protruding from the side wall of the socket body and having registering holes 21. Ears 20 preferably lie in planes perpendicular to the plane extending through the centers of socket flanges 19.

A locking lever 22 is pivoted at one end at 23 to a pair of ears 24 secured to the skirt 13 of the cap. The lever 22 pivots in a plane extending through the line passing through the center of the spacing between the two cap flanges 18. In the locked position of the cap, the lever 22 is pivoted to extend between the socket ears 20. The lever 22 has a hole 25 which registers with the ear holes 21, so that a padlock can be used to lock the lever 22 to the ears 20.

Figure 1:
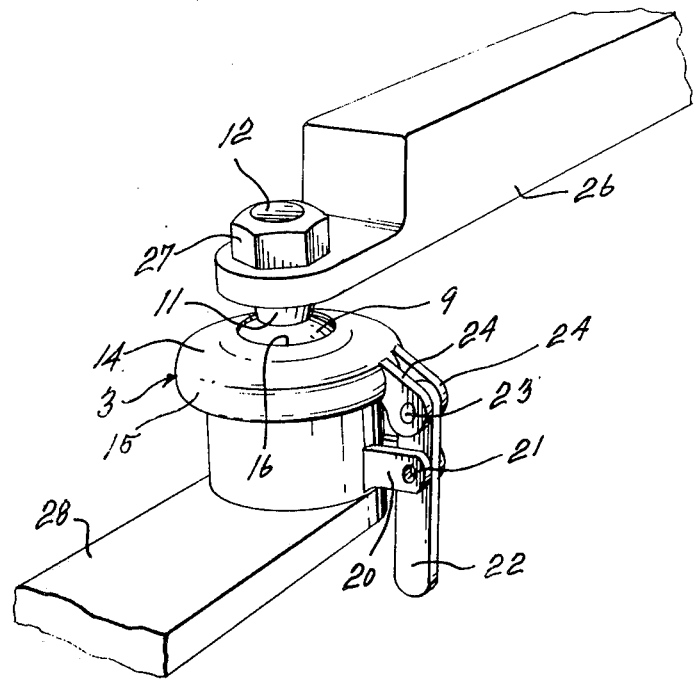
FIG. 1 is a perspective view of the assembled ball and socket coupling of the invention.

When the coupling is used as a trailer hitch, the ball member 2 is preferably secured to a draw-bar 26 of the trailer in downwardly extending position, as shown in FIG. 1, by means of a nut 27 screwed on the threaded stem portion 12 of the ball member. The socket 1 is secured in upstanding position by means of bolt 8 to the top of a bracket 28 secured at the rear of a hauling vehicle. Thus, it is a simple matter to bring the ball in register with the socket, drop the ball within the socket; thereby the cap will automatically come in position ready to be locked provided the lever is aligned with the longitudinal axis of the bracket 28. The lever is used to rotate the cap through one-quarter turn, then the lever is pushed between ears 20; and the coupling connection is completed.

It will be noted that in the locked position of the cap, the lever extends at right angles to the hauling axis out of the way of the draw-bar and of the bracket for easy access thereto. Obviously, the relative positions of the ball and socket can be reversed with the ball upstanding from bracket 28 and the socket downwardly extending from the draw-bar 26.

FIG. 5 shows a modified embodiment of the ball and socket coupling which provides still greater safety against accidental removal of the ball from within the socket, because the cap is firmly retained to the socket practically all around the cap and socket.

The socket 1' of FIG. 5 is of the same construction as the socket 1 having the same socket flanges 19' as flanges 19, but being provided in addition with a second pair of flanges 29 protruding radially outwardly from the side wall of the socket body a greater distance than flanges 19', and being diametrically opposed and arranged in register with the spacing between flanges 19'. Thus, the line joining the centers of the flanges 29 is at right angles to the line joining the centers of the socket flanges 19'. Flanges 29 are offset with respect to flanges 19' inwardly from the outer end 6' of the socket 1' a distance at least equal to the thickness of the flanges 18' of cap 3'. These cap flanges 18' are similar to the cap flanges 18 of the first embodiment. However, the skirt 15' of the cap 3' has its portions located between the flanges 18' extended downwardly, as shown at 30, and provided with an additional pair of inwardly directed flanges 31 at their free edges. The length of the flanges 31 is at the most equal to the spacing between the socket flanges 19'. When the cap closes the socket 1', the flanges 18' overlap the socket flanges 19', while the flanges 31 overlap the flanges 29. The socket flanges 29 protrude from the socket side wall a greater amount than the socket flanges 19'. The inner edges 32 of the additional cap flanges 31 lie on a circle, the diameter of which is slightly greater than the diameter of the circle in which lie the outer edges of the socket flanges 19', so that in the position shown in FIG. 5, upon lowering of the cap, the cap flanges 31 will clear the socket flanges 19', while the cap flanges 18' will come to rest on the additional socket flanges 29. Then rotation of the cap through one-quarter turn will cause the cap flanges 18' to engage and overlap underneath the socket flanges 19' and, at the same time, the flanges 31 will engage underneath the socket flanges 29 in overlapping position.

When the ball member 2 is secured to a trailer and it is desired to prevent theft of the trailer, the anti-theft device of FIG. 6 can be fitted to the ball member, as shown in FIG. 7. This anti-theft device, indicated at 40, includes a cylindrical body 41 open at both ends and formed at one end with two diametrically-opposed flanges 42 which are radially extending, adapted to come into overlapping inter-engagement with the cap flanges 18 of cap member 3. The other end of the body 41 is cut out and forms parallel ears 43 for receiving therebetween the locking lever 22 of the cap 3 to lock the lever by means of a padlock 45, or the like, the shank of which extends through holes 45 of the ears 43 and through the hole 25 of the lever, as shown in FIG. 7. Thus, it is impossible to hitch the trailer provided with the anti-theft device 40 to the socket member of an unauthorized vehicle.

FIG. 8 shows a vertically adjustable bracket member to be used for carrying the ball member 2 at an adjusted level, so that when fitted into the socket of a hauling vehicle, the trailer will be substantially horizontal on flat ground. This bracket includes an L-shaped plate 46 adapted to be secured to the apex front end of converging frame members 47 of a trailer with the short leg 48 flat against the underside of the frame members 47. The longer front leg of the L-shaped plate is provided with a series of pairs of holes 49 at different levels.

A support 50 can be secured by means of bolts 51 at an adjustable level with respect to the L-shaped plate 46 by passing the bolts 51 through anyone of the pairs of holes 49. The support 50 includes a pair of diverging legs 52 provided with holes 53 for securing the legs against the frame members 47 once the proper level of the support has been obtained. The support includes a shelf 54 to which is secured the ball member 2.

What I claim is:

1. A ball and socket coupling comprising a ball member having a stem adapted to be secured to one of two parts to be coupled, a socket member having a hemispherical cavity with an open end for receiving said ball member in sliding contact with said cavity and having means for securing said socket member to the other of said two parts, a cap, securing means to removably secure said cap to said socket in a position to close said open end of said socket, said cap having a central hole of a size greater than the cross-sectional size of said stem but smaller than that of said ball member, said stem extending through said cap hole, said cap having an inner surface adjacent and surrounding said hole, in sliding contact with said ball, whereby said cap forms an abutment for said ball member all around said stem and prevents disengagement of said ball from within said socket, while allowing pivoting of said ball in all planes within said socket, said securing means including a first set of complementary circular flanges on said cap and on said socket, said flanges being inter-digitated and clearing one another in one angular position of said cap relative to said socket and being in overlapped cap-securing engagement in another angular position of said cap relative to said socket, and a second set of flanges on said socket arranged in register with the respective spacings between the socket flanges of the first set and at a level inwardly from said flanges of the first set relative to the open end of the socket, said flanges of said second set protruding outwardly from the side wall of the socket a greater distance than the flanges of the first set, said cap having skirt portions between the cap flanges of the first set extended further away than said cap flanges of said first set, said extended skirt portions carrying radially inwardly protruding additional flanges having an outer edge lying on a circle, the diameter of which is slightly greater than the diameter of the circle circumscribing the outer edges of the socket flanges of the first set, whereby said additional cap flanges can clear said first set of socket flanges, and when said cap is in secured position, said first set of cap flanges overlaps said first set of socket flanges and said additional cap flanges overlap said socket flanges of the second set.

2. A ball and socket coupling as claimed in claim 1 further including an anti-theft device to be fitted to said ball member instead of said socket member, said anti-theft device consisting of an open-ended cylindrical body having a pair of outwardly directed flanges at one end, adapted to overlap the cap flanges of the first set and having a pair of outwardly directed ears at the other end adapted to receive therebetween a locking lever pivotally carried by said cap.

* * * * *